United States Patent [19]

Kroker et al.

[11] Patent Number: 5,140,071
[45] Date of Patent: Aug. 18, 1992

[54] AQUEOUS EPOXY RESIN DISPERSIONS WITH REACTIVE EMULSIFIERS FOR SIZING CARBON FIBERS AND GLASS FIBERS

[75] Inventors: Joerg Kroker, Neustadt, Fed. Rep. of Germany; Silvio Vargiu, Casatenovo, Italy

[73] Assignee: BASF Aktiengesellschaft, Ludwigshafen, Fed. Rep. of Germany

[21] Appl. No.: 630,097

[22] Filed: Dec. 19, 1990

[30] Foreign Application Priority Data

Dec. 23, 1989 [DE] Fed. Rep. of Germany ....... 3942858

[51] Int. Cl.$^5$ ............................ C08K 9/04; C08K 3/04; C08K 3/40; C08K 7/14
[52] U.S. Cl. .................................. 523/209; 523/215; 523/217; 523/403
[58] Field of Search ................. 523/209, 215, 217, 403

[56] References Cited

U.S. PATENT DOCUMENTS

| | | | |
|---|---|---|---|
| 2,743,254 | 4/1956 | De Groote | 525/504 |
| 3,957,716 | 5/1976 | Weldy | 523/468 |
| 4,049,597 | 9/1977 | Motsinger | 523/403 |
| 4,330,444 | 5/1982 | Pollman | 523/404 |
| 4,394,418 | 7/1983 | Temple | 523/404 |
| 4,433,079 | 2/1984 | Kobayashi et al. | 523/402 |
| 4,468,254 | 8/1984 | Yokoyama et al. | 524/478 |
| 4,636,541 | 1/1987 | Stevens et al. | 523/404 |
| 4,654,264 | 3/1987 | Asai et al. | 428/367 |

OTHER PUBLICATIONS

"Patent Review on Soaps, Defergents and Emulsifiers", vol. 1 1966, John W. McCutcheon, Inc.

Primary Examiner—Melvyn I. Marquis
Assistant Examiner—Christopher P. Rogers
Attorney, Agent, or Firm—William G. Conger

[57] ABSTRACT

A sizing agent for carbon fibers and glass fibers is based on an aqueous dispersion containing an epoxy resin and from 5 to 40% by weight, based on the epoxy resin, of a nonionic emulsifier containing teritary amino groups and/or ether linkages and at least one functional radical capable of reaction with the epoxy resin, preferably a glycidyl radical, and also at least one emulsifying radical which preferably carries a polyethylene glycol group in the terminal position.

12 Claims, No Drawings

AQUEOUS EPOXY RESIN DISPERSIONS WITH REACTIVE EMULSIFIERS FOR SIZING CARBON FIBERS AND GLASS FIBERS

The present invention relates to a sizing agent for carbon fibers and glass fibers based on an aqueous dispersion of an epoxy resin and an emulsifier which contains reactive functional groups which are capable of reaction with the matrix resin during the curing of the fiber/matrix composite.

In particular, the emulsifier in question contains glycidyl units

Carbon fibers consist of several hundred to hundred thousand individual filaments about 5–20 μm in diameter and typically have a tensile strength of from 1,000 to 7,000 MPa and a modulus of elasticity of from 200 to 700 GPa. Details are given for example in M. S. Dresselhaus et. al., Graphite Fibers and Filaments, Springer Series in Material Science, Vol. 5, Springer Verlag, Berlin (1988).

The combination of excellent mechanical properties on the one hand and a light weight and high thermal and chemical resistance on the other has led to these materials being increasingly used as reinforcing elements in composite materials. Of particular interest are carbon fiber reinforced plastics whose matrices are synthetic resins such as epoxy resins, unsaturated polyester resins, vinyl ester resins, bismaleimide resins or cyanate resins.

It is known that the adhesion between the matrix and the fiber has a critical bearing on the mechanical properties of fiber composites. The strength of the adhesive bond depends primarily on the morphology and chemical nature of the fiber surface, the size and the curing conditions.

The basic problem is that carbon fibers have inherently only little affinity for matrix resins. To increase the strength of the adhesive bond between the fiber and the matrix, the fibers are therefore subjected to an oxidative surface treatment as described for example in EP-A-293,867 and EP-A-251,491. This treatment serves to produce the functional, reactive groups on the fiber surface which are capable of chemically bonding to the matrix resin.

Another possibility which is generally employed in the technology of fiber reinforced plastics is the application of a size to the fiber According to DE-A-3,718,171, a certain size is in general only advantageous for a specific combination of fiber and matrix system.

This is the reason why a multiplicity of different sizes have been proposed in the past. For example, EP-A-256,852 describes ethylenically unsaturated urethanes for use as sizing agents. Carbon fibers treated therewith are suitable in particular for reinforcing UP and VE resins. Epoxy sizes are, by contrast, unsuitable for this purpose, since their affinity for the matrix resins mentioned is not sufficient; composites lacking in interlaminar shear strength are the consequence.

U.S. Pat. No. 4,489,129 discloses carbon fibers sized with poly(phenylene sulfide) for incorporation in PPS as matrix material. Similarly, EP-A-216,518 proposes a thermoplastic size. Preferably, the fibers coated therewith are used for reinforcing thermoplastic matrices A further example is provided by DE-A-2,606,623 and U.S. Pat. No. US-A-4,107,128. The carbon fibers sized therein with an epoxy resin are particularly highly suitable for incorporation in an epoxy matrix material.

The size is to be more than just an adhesion promoter. It is also meant to improve the processibility of the fibers in all operations leading to the finished composite component. The fiber bundle and its very fragile filaments must be adequately protected against mechanical stress without thereby losing texture, drapability and spreadability. Certainly, the filaments must not be caused to adhere to one another by the sizing agent.

Sizing agents for filamentary materials are applied to the fiber material either as solution or as aqueous dispersion. Compared with the solution type, where the sizing agent—usually a resin—is in solution in a low-boiling organic solvent, aqueous dispersions, in which the sizing agent is dispersed in water with the aid of an emulsifier, are preferable.

However, the advantage in handling, unless the substances to be dispersed are self-emulsifying, is gained at the cost of the presence of an emulsifier in the size. Typically, it is necessary to use, depending on the resin to be dispersed and the emulsifier used, about 5–50% by weight of the emulsifier, based on the resin, to obtain sufficiently finely divided dispersions which are stable to storage and shearing even when highly diluted.

For example, DE-A-3,436,211 describes a sizing agent for carbon fibers where a block copolymer of ethylene oxide and propylene oxide of the schematic formula

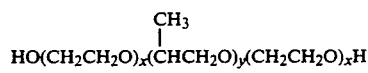

is used as emulsifier for dispersing epoxy resins. Such emulsifiers are not capable, for lack of appropriate reactive groups, of reacting under the curing conditions of the matrix material, typically an epoxy resin. Consequently, chemical attachment of the emulsifier to the matrix material during the composite fabrication process is extremely unlikely. The appearance of additional interfaces, namely between the emulsifier and the matrix resin, within the area of the already critical fiber-matrix interface is the consequence.

Similarly, the abovementioned self-emulsifying or even water-soluble sizing agents for carbon fibers having proved to be disadvantageous, as can be discerned from US-A-4,654,264. Composites which contain fibers provided with such sizes have poor mechanical properties, in particular under the simultaneous action of heat and moisture.

It is an object of the present invention to provide a sizing agent for treating carbon fibers and glass fibers for reinforcing epoxy resin matrices which is free of organic solvents and hence safe in respect of toxicity and flammability, which has no adverse effect on the processibility of the fiber bundles treated therewith in respect of texture, drapability and spreadability, and which is chemically highly compatible with epoxy resin matrices, thereby permitting the fabrication of composite components having improved physical properties, in particular under hot and moist conditions.

We have found that this object is achieved by the present invention by a size which contains an epoxy resin and from 5 to 40% by weight, based on the epoxy resin, of a nonionic tertiary amine-based emulsifier or an aromatic-aliphatic ether, which has at least one functional radical comprising at least one radical capable of reaction with the epoxy resin for chemical attachment to the epoxy resin/matrix resin under the curing conditions of the matrix resin, preferably a glycidyl radical, and also has at least one emulsifying radical, preferably a polyethylene oxide radical. The functional radical may occupy any suitable substitutable position, whereas the emulsifying radical is attached to the tertiary nitrogen atom or to the ether oxygen.

The basic structure of the nonionic emulsifier—hereinafter referred to as reactive emulsifier—is an aromatic or cycloaliphatic amine or an aromatic-aliphatic polyether. Possible amines are for example hydantoins (I), cyanuric acids (II), aminophenols (III) and, preferably, aminophenyls (IV) and possible aromatic-aliphatic polyethers are polyphenylol alkyls (V, VI), hydroxyphenols (VIII) and preferably bisphenols (VII), which each have reactive substituents on the one hand and emulsifying substituents on the other; namely

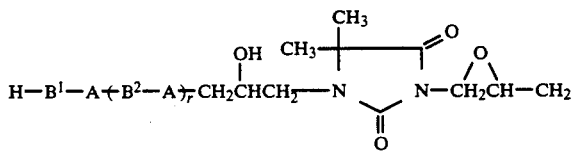

I

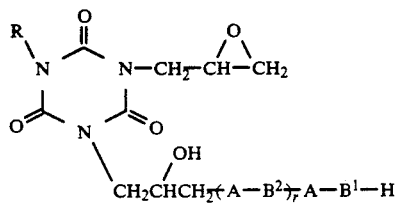

II

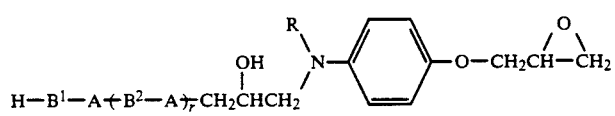

III

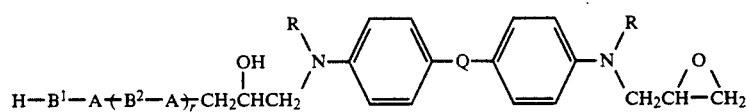

IV

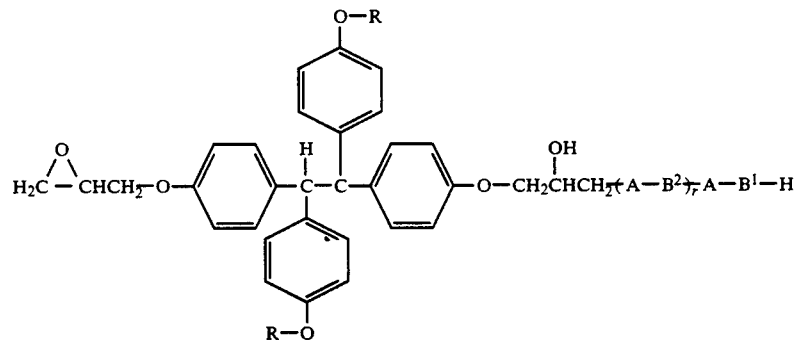

V

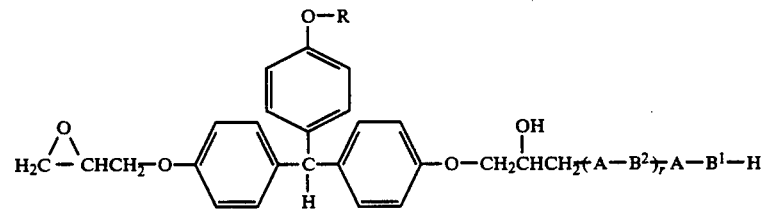

VI

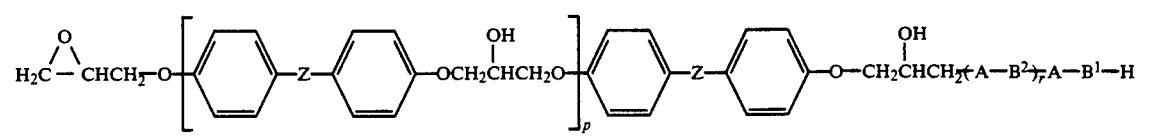

VII

-continued

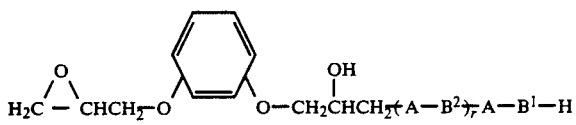
VIII where the symbols have the following meanings:

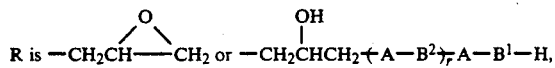

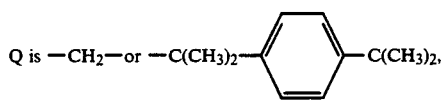

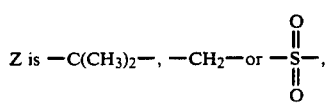

p is zero or an integer or noninterger of up to 5, A is the radical of a saturated or unsaturated aliphatic or cycloaliphatic, or of an aromatic or araliphatic, dicarboxylic acid of from 2 to 20 carbon atoms, $B^1$ is the radical of a polyetherdiol of the structure $[X_m Y_n]$, where X designates units of ethylene glycol, Y designates units of propylene glycol, m is from 10 to 500 and n is from zero to 100, X and Y being arranged in blocks or any other manner with the proviso that there are at least 10 X units at the terminal end, $B^2$ is the radical of a diol, and r is zero or an integer from 1 to 5. Preferably, $B^2$ carries a secondary OH group, and r is zero or 1.

The total number of reactive and emulsifying substituents in the molecule is accordingly at least 2, with each molecule having at least one reactive and one emulsifying radical.

The principle of the reactive emulsifier according to the present invention makes it possible to combine the advantages of sizing agents which can be applied from solution, i.e., are free of emulsifying aids, with those applied as aqueous dispersions.

To prepare the tertiary amines used as reactive emulsifiers it is convenient to start from the corresponding known (poly)glycidylamines. Examples are N,N'-diglycidyl-4,4-dimethylhydantoin (Ia), triglycidylcyanuric acid (IIa), N, N-diglycidyl-p-aminophenylglycidyl ether (IIIa), N,N,N',N'-tetraglycidyl-α,α-bis(4-amino-phenyl)-p-diisopropylbenzene (IVb) and, preferably, N,N,N',N'-tetraglycidyl-p-diphenyldiaminomethane (IVa).

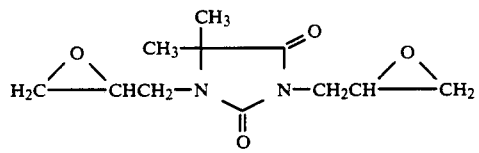
Ia

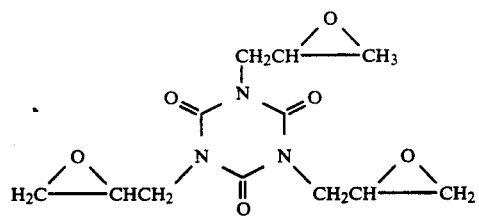
IIa

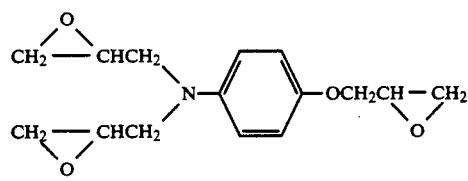
IIIa

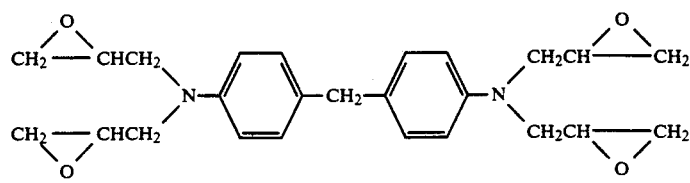
IVa

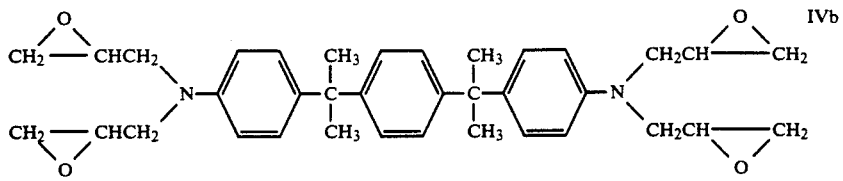

IVb

In the same way, the aromatic-aliphatic ether reactive emulsifiers are advantageously prepared starting from the known polyglycidyl ethers. These are for example 1,1,2,2,-tetraphenylolethane tetraglycidyl ether (Va), triphenylolmethane triglycidyl ether (VIa), bisphenol didlycidyl ether (VIIa, b, c) or hydroxyphenol diglycidyl ether (VIIIa), namely Depending on the intended target product, there is then a choice of reactant:

For example, first one equivalent of a polyetherdiol H—B$^1$—H is reacted with approximately one equivalent of the dicarboxylic acid H—A—H or the anhydride thereof in a conventional condensation reaction to give the half-ester H—B$^1$—A—H.

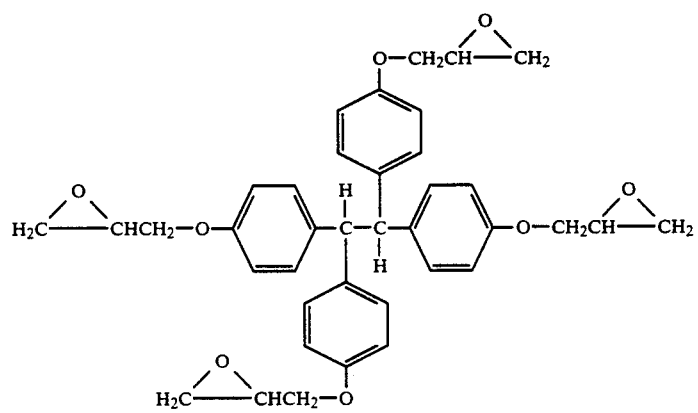

Va

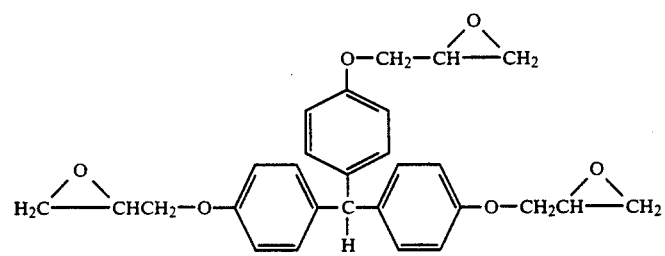

VIa

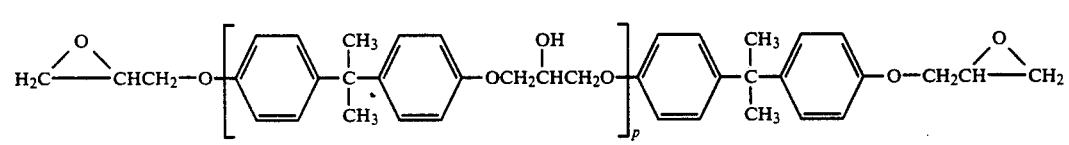

VIIa

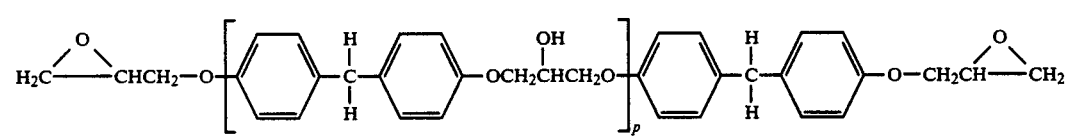

VIIb

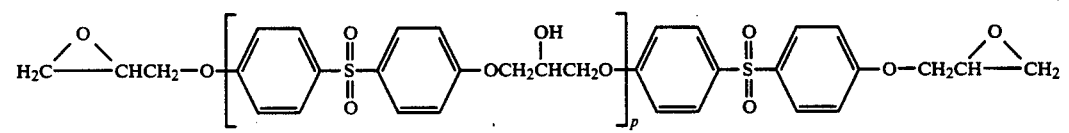

VIIc

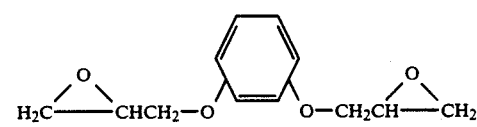

VIIIa

In the second step, sufficient numbers of equivalents of (poly)glycidylamine or polyglycidyl ether and half-ester H—B¹—A—H are reacted so as to produce the numerical substituent ratio according to the present invention. In practice, the reaction is continued until the acid number has dropped to below about 2 mg of KOH/g.

Another possibility is first to prepare the half-ester H—B¹—A—H as described above and then to condense one equivalent of this half-ester with approximately one equivalent of a diol H—B²—H or preferably the corresponding diepoxide until the acid number has dropped to below about 1 mg of KOH/g. Thereafter approximately one equivalent of the resulting diester H—B¹—A—B²—H is then condensed with approximately one equivalent of a dicarboxylic acid H—A—H or an anhydride thereof to give the corresponding oligoester H—B¹—A—B²—A—H.

In the second step, corresponding amounts of (poly)-glycidylamine or polyglycidyl ether are in turn reacted with the oligoester product until the acid number has dropped to below about 2 mg of KOH/g.

Alternatively, the above-described polyetherdiol diester H—B¹—A—B²—H is reacted with approximately one equivalent of a secondary N-alkylalkanolamine before a further condensation reaction is carried out with approximately one equivalent of a dicarboxylic acid H—A—H or anhydride thereof to arrive at the alkanolamine-modified oligoester.

Thereafter the (poly)glycidylamine or polyglycidyl ether is then in turn reacted with the modified oligo-ester until the acid number has dropped to below about 2 mg of KOH/g.

The dicarboxylic acid H—A—H referred to above may in fact also be a mixture of various such dicarboxylic acids; it is possible to use aromatic, araliphatic and cycloaliphatic dicarboxylic acids of from 2 to 20 carbon atoms or the anhydrides thereof. Preference is given to tetrahydrophthalic acid and maleic acid; but it is also possible to use, for example, fumaric acid, itaconic acid, endomethylenetetrahydrophthalic acid, adipic acid, succinic acid, tricyclo[5.2.1.0$^{2.6}$]decanedicarboxylic acid, isophthalic acid, terephthalic acid, ortho- and meta-phthalic acid, and anhydrides thereof, if preparable.

Suitable diols H—B¹—H are for example polyethylene oxide/polypropylene oxide block copolymers having a molecular weight of from 3,500 to 15,000 and also polyethylene oxide having a molecular weight of from 500 to 6,000. Preference is given to polyethylene oxide having a molecular weight of about 1,500.

The diols H—B¹—H are preferably used in the form of the corresponding α,ω-diepoxides. Preferred diepoxides are diglycidyl ethers of bisphenols having an epoxy equivalent weight of from 165 to 1,000.

The preferred secondary N-alkylaminoalcohol is N-butylethanolamine.

The main constituent of the sizing agent for carbon fibers according to the present invention is an epoxy resin. Possible epoxy resins are the customary glycidyl ethers of mono- or polyfunctional alcohols, preferably aromatic alcohols, having epoxy equivalent weights of approximately 100–1,500 g/eq. Preference is given to diglycidyl ethers of bisphenols A and F.

To prepare the size, 100 parts by weight of epoxy resin are added together with from 5 to 40, in particular from 8 to 30, parts by weight of the emulsifier, and the mixture is heated and homogenized by stirring until a clear melt has formed. Thereafter sufficient cold water is incorporated a little at a time by intensive shearing, for example by means of a high-speed dissolver, until a homogeneous resin-in-water dispersion has formed, which can then be diluted to the desired application concentration by further addition of water. Preferably, the ready-produced dispersion has a solids concentration of from 1 to 10% by weight.

The size thus prepared is a very finely divided dispersion which even if highly diluted shows very good storage and shear stability, superb film-forming properties and excellent affinity for carbon fiber.

To apply the sizing agent according to the present invention to carbon fibers, they are passed through a dip bath containing the size dispersion and then dried in a hot air stream at about 140° C. The level of sizing agent on the fiber should then be about 0.3–10, L preferably 0.5–2, % by weight.

It will be readily understood that the numerical ratio of the reactive functional groups fixed in the emulsifier molecule and the emulsifying groups on the one hand to the amount required for dispersing the particular resin on the other will always be mutually dependent to a certain degree For this reason the emulsifier should always be chosen in such a way that the amount required for preparing the resin dispersion is the minimum amount. An excessively high emulsifier content of the sizing agent has an adverse effect, in particular on the hot and moist properties of the laminates which contain fibers treated with the size. If, by contrast, the emulsifier content of the resin mix to be dispersed is too low, this leads to a qualitatively unsatisfactory dispersion which does not meet the required properties in respect of particle size and distribution, storage and shear stability and film-forming characteristics.

The most suitable mixing ratios are advantageously decided from preliminary experiments, for which the Examples which follow may serve as reference points A. Preparation of reactive emulsifiers

EXAMPLE I

In a 4-1 three-necked flask equipped with a vane stirrer, an internal thermometer and a protective gas supply, 1,475 g of a polyethylene oxide having an OH number of 76 mg of KOH/g (Pluriol E 1500 from BASF AG) are admixed at 100° C. with 150 g of tetrahydrophthalic anhydride by stirring After the temperature has been raised to 130° C., the condensation reaction is allowed to proceed at that temperature until the acid number is about 34 mg of KOH/g. 504 g of an N,N,N',N'-tetragly-cidyl-p-diphenyldiaminomethane resin having a potentiometrically determined epoxy equivalent weight of 126 g/eq (Araldite ® MY 720 from Ciba-Geigy) are then introduced. Stirring is continued at that temperature until the acid number is below 1 mg of KOH/g. The potentiometrically determined epoxy equivalent weight of the product is 950 g/eq.

EXAMPLE II (First the half-ester of 1,475 g of polyethylene oxide Pluriol ® E 1500 from BASF AG) and 150 g of tetrahydrophthalic acid is prepared as described in Example I. Following addition of 380 g of a diglycidyl ether of bisphenol A having an epoxy equivalent weight of 190 g/eq (Epikote ® 828 from Shell), the temperature is raised to 160° C. and the mixture is left at that temperature until an acid number of 1 mg of KOH/g has been reached. The mixture is cooled down to 110° C., and 117 g of N-butyl(ethanolamine) are added. After 1 h a further 150 g of tetrahydrophthalic acid are added, and the temperature is raised to 130° C. The mixture is left at that temperature until the acid number has dropped to about 25 mg of KOH/g. 504 g of an N,N,N',N'-tetraglycidyl-p-diphenyldiaminomethane resin having an epoxy equivalent weight of 126 g/eq (Araldite ® MY 720 from Ciba-Geigy) are then added. The temperature is raised to 140° C. and the mixture is stirred until the acid number is 1 mg of KOH/g The potentiometrically determined epoxy equivalent weight of the product is 1,030 g/eq

EXAMPLE III

Example I is repeated, except that only 378 g of N,N,N',N'-tetraglycidyl-p-diphenyldiaminomethane resin having an epoxy equivalent weight of 126 g/eq (Araldite ® MY 720 from Ciba-Geigy) are used.

EXAMPLE IV

Example I is repeated, except that the glycidylamine is replaced by 660 g of a tetraphenylolethane tetraglycidyl ether resin having an epoxy equivalent weight of 200 g/eq (Epikote 1031 from Shell). The mixture is stirred at 90° C. until the acid number has decreased to below 1 mg of KOH/g. The potentiometrically determined epoxy equivalent weight is 1,094 g/eq, and the vapor pressure osmometrically determined molecular weight is 2,960 g/mol (chloroform).

EXAMPLE V

Example I is repeated, except that the glycidylamine is replaced by 380 g of a diglycidyl ether of bisphenol A having an epoxy equivalent weight of 190 g/eq (DER 330 from Dow Chem.). The mixture is stirred at 100° C. until the acid number has decreased to below 1 mg of KOH/g. The potentiometrically determined epoxy equivalent weight is 2,096 g/eq.

B. Preparation of epoxy resin dispersions

EXAMPLE VI 170 g of a diglycidyl ether of bisphenol A having an epoxy equivalent weight of 190 g/eq (Epikote ® 828 from Shell), 370 g of a diglycidyl ether of bisphenol A having an epoxy equivalent weight of 475 g/eq (Epikote ® 1001 from Shell) and 95 g of the reactive emulsifier obtained as described in Example I are added together, and the mixture is heated to 70° C. and stirred until a clear homogeneous melt has formed The heat source is removed, and the mixture is cooled down to about 65° C. At that temperature, the resin melt mix is intensively stirred with a dissolver disk at 1,500 min.$^{-1}$ while 300 g of deionized water are slowly added in the course of about 30 min. The dispersion concentrate thus obtained then has a temperature of about 45° C. The speed of the dissolver disk is then reduced to about 200 min$^{-1}$, and a further 655 g of deionized water are added to adjust the solids concentration of the dispersion to about 40% by weight

| Properties of the resin melt mix before dispersing: | |
|---|---|
| Epoxy equivalent weight: | 460 g/eq |
| Brookfield viscosity at 60° C.: | 32,400 mPas |
| Glass transition temperature: | −1° C. |
| Properties of the resulting aqueous dispersion: | |
| Solids content: | 39.4% |
| Particle size distribution: | 90% < 2.5 μm |
| | 50% < 1.5 μm |
| | 10% < 0.7 μm |
| Gravimetric stability over 24 h of dispersion diluted to 3% with deionized water: | 94.5% |
| Film-forming properties: | very good |

EXAMPLE VII

Example IV is repeated, except that the resin melt mix to be dispersed is composed of 139 g of a diglycidyl ether of bisphenol A having an epoxy equivalent weight of 190 g/eq (Epikote 828 from Shell), 303 g of a diglycidyl ether of bisphenol A having an epoxy equivalent weight of 475 g/eq (Epikote ® 1001 from Shell), 66 g of an N,N,N',N'-tetraglycidyl-p-diphenyldiaminomethane resin having an epoxy equivalent weight of 126 g/eq (Araldite MY 720 from Ciba-Geigy) and 127 g of the emulsifier prepared as described in Example II.

| Properties of the resin melt mix before dispersing: | |
|---|---|
| Epoxy equivalent weight (potentiometrically): | 445 g/eq |
| Brookfiel viscosity at 60° C.: | 33,500 mPas |
| Glass transition temperature (DSC): | +3° C. |
| Properties of the resulting aqueous dispersion: | |
| Solids content: | 37.8% |
| Particle size distribution: | 90% < 1.1 μm |
| | 50% < 0.7 μm |
| | 10% < 0.4 μm |
| Gravimetric stability over 24 h of dispersion diluted to 3% with deionized water: | 99% |
| Film-forming properties: | very good |

EXAMPLE VIII

Example IV is repeated, except that the resin melt mix to be dispersed is composed of 149 g of a diglycidyl ether of bisphenol A having an epoxy equivalent weight of 190 g/eq (Epikote 828 from Shell), 324 g of a diglycidyl ether of bisphenol A having an epoxy equivalent weight of 475 g/eq (Epilote 1001 from Shell), 36 g of an N,N,N',N'-tetraglycidyl-p-diphenyldiaminomethane resin having an epoxy equivalent weight of 126 g/eq (Araldite My 720 from Ciba-Geigy) and 126 g of the emulsifier prepared as described in Example II.

| Properties of the resin melt mix before dispersing: | |
|---|---|
| Epoxy equivalent weight (potentiometrically): | 675 g/eq |
| Brookfield viscosity at 60° C: | 35,200 mPas |
| Glass transition temperature (DSC): | +1° C. |
| Properties of the resulting aqueous dispersion: | |
| Solids content: | 40.3% |
| Particle size distribution: | 90% < 3.1 μm |
| | 50% < 1.7 μm |
| | 10% < 0.8 μm |
| Gravimetric stability over 24 h of dispersion diluted to 3% with deionized water: | 95.3% |
| Film-forming properties: | good |

EXAMPLE IX

Example VI is repeated, except that the emulsifier used therein is replaced by 99 g of the emulsifier prepared as described in Example IV.

| Properties of the resin melt mix before dispersing: | |
|---|---|
| Epoxy equivalent weight (potentiometrically): | 425 g/eq |
| Brookfield viscosity at 60° C: | 35,100 mPas |
| Glass transition temperature (DSC): | +2° C |
| Properties of the resulting aqueous dispersion: | |
| Solids content: | 37.2% |
| Particle size distribution: | 90% < 2.7 μm |
| | 50% < 1.2 μm |
| | 10% < 0.8 μm |
| Gravimetric stability over 24 h of dispersion diluted to 3% with deionized water: | 95% |
| Film-forming properties: | good |

EXAMPLE X

Example VI is repeated, except that the emulsifier used therein is replaced by 99 g of the emulsifier prepared as described in Example V.

| Properties of the resin melt mix before dispersing: | |
|---|---|
| Epoxy equivalent weight (potentiometrically): | 425 g/eq |
| Brookfield viscosity at 60° C.: | 36,400 mPas |
| Glass transition temperature (DSC): | +3° C. |
| Properties of the resulting aqueous dispersion: | |
| Solids content: | |
| Particle size distribution: | 90% < 1.0 μm |
| | 50% < 0.6 μm |
| | 10% < 0.3 μm |
| Gravimetric stability over 24 h of dispersion diluted to 3% with deionized water: | 99% |
| Film-forming properties: | very good |

We claim:

1. A sizing agent for carbon fibers and glass fibers suitable for use in preparing thermosetting epoxy matrix resin fiber reinforced products based on an aqueous dispersion containing an epoxy resin and from 5 to 40% by weight, based on the epoxy resin, of a nonionic emulsifier, wherein the emulsifier contains tertiary amino groups or ether linkages and has at least one functional radical which reacts with the epoxy resin under the curing conditions of said epoxy matrix resin and at least one emulsifying radical wherein the functional radical is a glycidyl radical and the emulsifying radical carries a polyethylene glycol group in the terminal position.

2. A sizing agent as claimed in claim 1, wherein the emulsifier has the structure IV where the symbols have the following meanings:

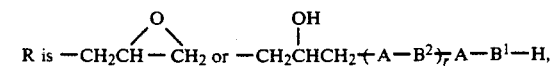

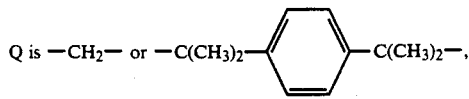

A is the radical of a saturated or unsaturated aliphatic or cycloaliphatic, or of an aromatic or araliphatic, dicarboxylic acid of from 2 to 20 carbon atoms, $B^1$ is the radical of a polyetherdiol of the structure, where X designates units of ethylene glycol, Y designates units of propylene glycol, m is from 10 to 500 and n is from zero to 100, X and Y being arranged in block or randomly with the proviso that there are at least 10 X units at the terminal end, $B^2$ is the radical of a diol, and r is zero or an integer from 1 to 5.

3. A sizing agent as claimed in claim 1, wherein the emulsifier has the structure I

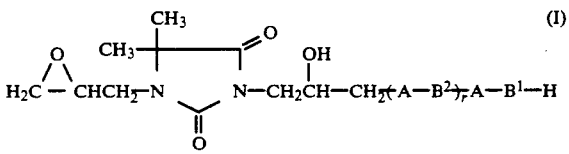

where A, $B^1$, $B^2$ and r are each as defined in claim 2.

4. A sizing agent as claimed in claim 1, wherein the emulsifier has the structure II

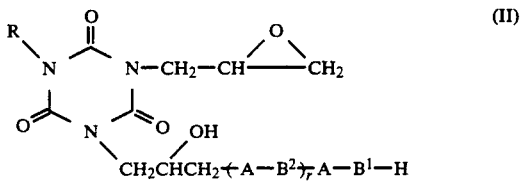

where A, R, $B^1$, $B^2$ and r are each as defined in claim 2.

5. A sizing agent as claimed in claim 1, wherein the emulsifier has the structure III

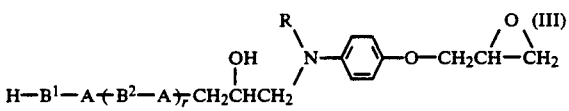

where A, R, $B^1$, $B^2$ and r are each as defined in claim 2.

6. A sizing agent as claimed in claim 1, wherein the emulsifier has the structure V

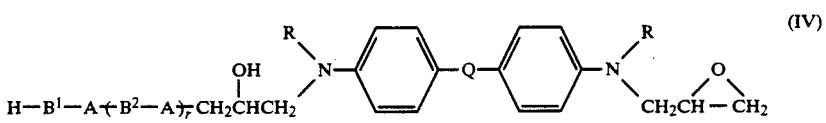

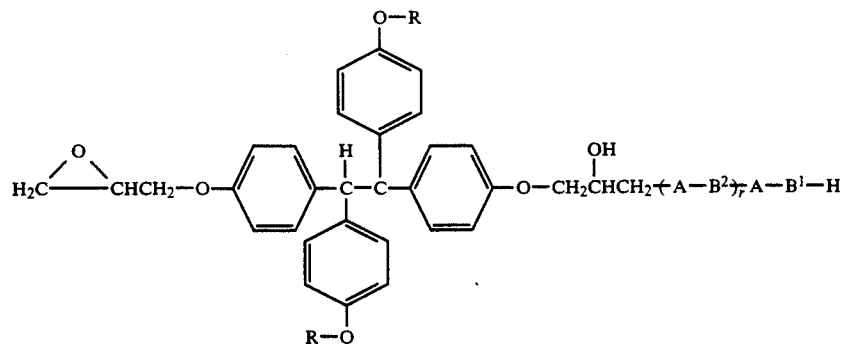

where R, A, B¹, B² and r are each as defined in claim 2.

7. A sizing agent as claimed in claim 1, wherein the emulsifier has the structure VI

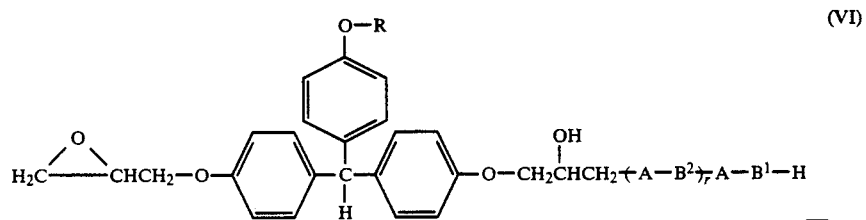

where R, A, B¹, B² and r are each as defined in claim 2.

8. A sizing agent as claimed in claim 1, wherein the emulsifier has the structure VII

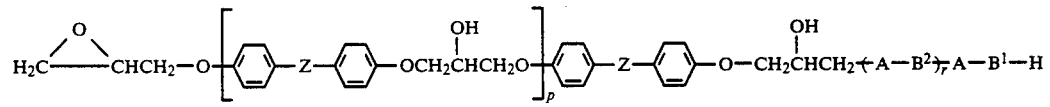

where
Z is —C(CH$_3$)$_2$—, —CH$_2$— or —S(O)$_2$—,
p is zero or an integer or noninterger of up to 5, and
A, B¹, B² and r are each as defined in claim 2.

9. A sizing agent as claimed in claim 1, wherein the emulsifier has the structure VIII

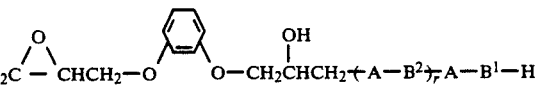

where A, B¹, B² and r are each as defined in claim 2.

10. A sizing agent as claimed in claim 1, wherein the epoxy resin is a polyglycidyl ether or an aromatic polyalcohol and has an epoxy equivalent weight of from 100 to 1,500 g/eq.

11. A carbon fiber which carries from 0.3 to 10% by weight of a sizing agent as claimed in claim 1.

12. A glass fiber which carries from 0.3 to 10% by weight of a sizing agent as claimed in claim 1.